J. H. DOWNING.
GRAIN DIVIDER FOR HARVESTERS.
APPLICATION FILED MAY 6, 1911.
1,033,088.
Patented July 23, 1912.
2 SHEETS—SHEET 1.
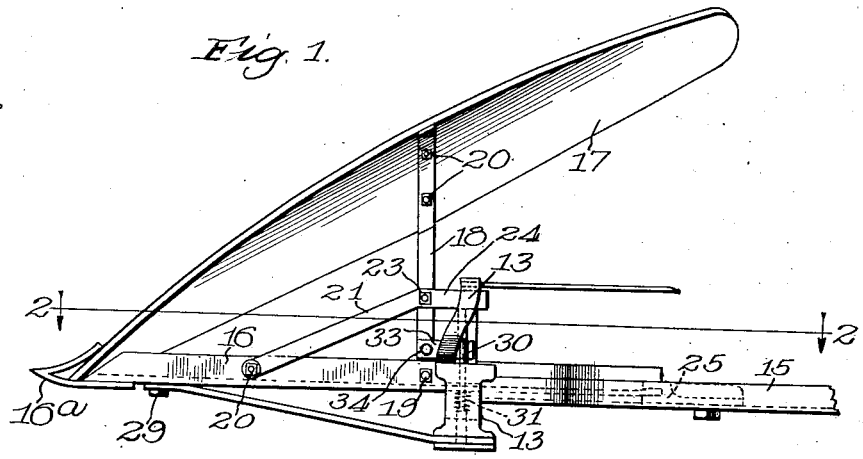
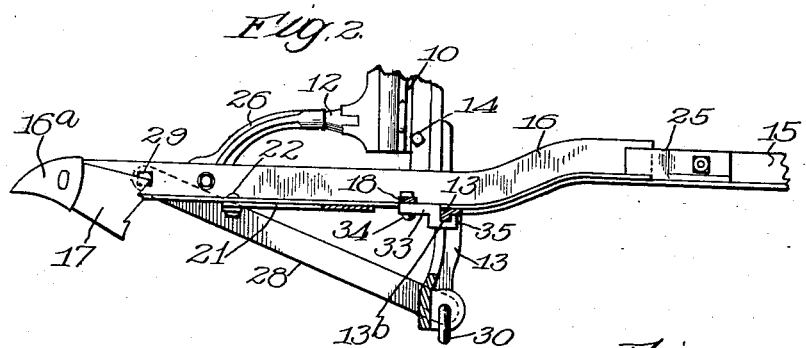
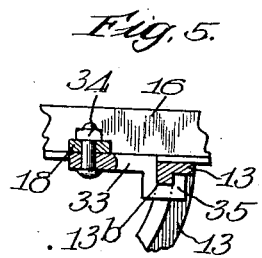
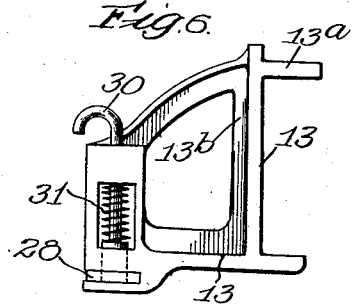
Witnesses.
Inventor
John H. Downing
By Brown Hopkins
Attys.

J. H. DOWNING.
GRAIN DIVIDER FOR HARVESTERS.
APPLICATION FILED MAY 6, 1911.

1,033,088.

Patented July 23, 1912.

2 SHEETS—SHEET 2.

Witnesses.

Inventor:
John H. Downing
By Brown & Hopkins
Attys

UNITED STATES PATENT OFFICE.

JOHN H. DOWNING, OF STILLWATER, MINNESOTA, ASSIGNOR TO THE STATE OF MINNESOTA.

GRAIN-DIVIDER FOR HARVESTERS.

1,033,088.  Specification of Letters Patent.  Patented July 23, 1912.

Application filed May 6, 1911. Serial No. 625,592.

*To all whom it may concern:*

Be it known that I, JOHN H. DOWNING, a subject of the King of England, residing at Stillwater, in the county of Washington and State of Minnesota, have invented certain new and useful Improvements in Grain-Dividers for Harvesters, of which the following is a specification.

The invention relates to grain dividers adapted to be located at the extremities of the cutter bars of harvesting machines.

The object of the invention is to provide an improved form of grain divider for harvesters that shall be readily detachable or removable from the harvester in order that the machine may not be rendered difficult of transportation when it is mounted on the usual transport trucks to be drawn endwise through gates or when it is desired to decrease the space which the machine will occupy in storage.

A further object of the invention is to provide an improved grain divider for harvesters which shall be removable or detachable without annoyance on the part of the operator and which at the same time shall be of simple and economical construction, constructed of materials which will permit its being made light enough to be readily handled by an operator and at the same time would be sufficiently strong to render the device capable and efficient in service.

To the attainment of these ends and to accomplish certain other new and useful objects, which will subsequently appear, the invention consists in the improvements in construction hereinafter more fully described, shown in the accompanying drawings forming a part of this specification and pointed out more specifically in the claims.

Figure 3:
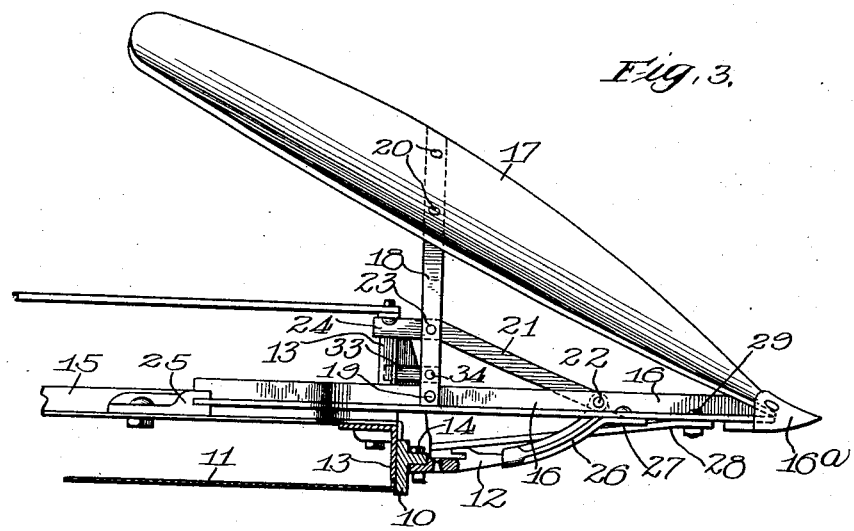
Figure 4:
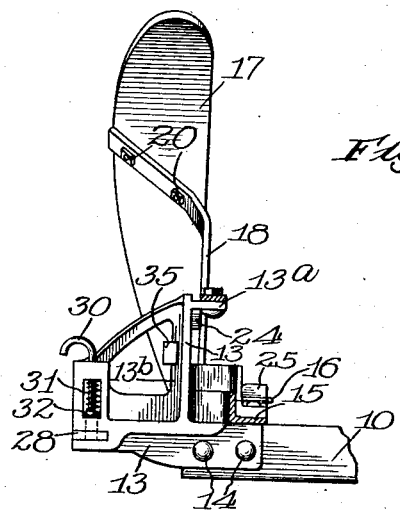

In the said drawings, Figure 1 is a side elevation of my improved grain divider, the view being taken looking toward the inner end of the harvester platform with broken parts only of the harvester platform to which the device is attached being shown. Fig. 2 is a sectional view of the device taken on the line 2—2 of Fig. 1, looking downward. Fig. 3 is a view similar to Fig. 1 but taken on the opposite side of the divider, portions of the harvester platform and the cutting apparatus being shown in section. Fig. 4 is a rear elevation view of the divider with parts of the harvester platform to which it is attached appearing in section. Figs. 5 and 6 illustrate details of construction of the operative parts used for securing the divider to the harvester.

The reference character 10 indicates the cutter bar of the harvester to which is secured a suitable platform, a portion of which is indicated by the reference character 11 consisting of a suitable piece of sheet metal secured at its forward edge to the cutter bar and extending lengthwise of the cutter bar and some distance rearwardly to form a bottom for the grain receiving platform over which the usual platform apron or other suitable conveying mechanism is placed.
The cutter bar 10 is provided with the usual guard fingers spaced apart to receive and support the reciprocating knife but since only the outer one of such guard fingers is related in any manner to the grain divider only such outer guard finger is shown, as indicated by the reference character 12.

At the outer extremity of the cutter bar 10 a divider supporting bracket 13 is secured in any desired manner, usually by bolts threaded and provided with nuts as indicated at 14. The bracket 13 may be utilized for supporting parts of the outer frame of the harvester platform in addition to the grain divider. For example, the platform is preferably provided with an end member of angle iron, as indicated by the reference character 15, the same being bolted at its forward extremity to the bracket 13. Near the top of bracket 13 an angular extension 13ª is provided to which is bolted or otherwise secured an upper end member of the platform. The removable divider consists of a suitable bar 16 adapted to be in engagement at one end with the harvester platform and extending forwardly to near the extremity of the divider point.

17 is the divider board which may be of the usual or any desired form, preferably widest near the middle thereof and contracted somewhat toward the rear but gradually narrowed toward the forward extremity until it may enter and be secured beneath a suitable housing or covered portion on the divider point 16ª, which secures both bar 16 and divider board together. The divider board 17 is further supported from bar 16 by means of an upright 18 consisting preferably of a bar of metal bolted at 19 to the bar 16 and being deflected at its upper extremity to conform to the under side of divider board 17 to which it is secured by suitable means, as bolts 20. Rigidity is further added to the construction of the divider by metallic brace 21 bolted at its forward extremity at 22 to bar 16, at 23 to upright 18, and having a portion thereof as indicated at 24 extending rearwardly from the upright 18. The rearmost extremity of bar 16 of the divider is adapted to enter into a slotted member, as indicated at 25, secured to the outside bar 15 of the grain platform. This connection of the divider with the platform is such as to prevent movement of the divider bar in any direction except in the direction of the forward advance of the machine.

When the divider is in position on the platform its connection with the platform is further strengthened by reason of the securement to the forward extremity, just behind the divider point, of a casting 26 which may be bolted as indicated at 22 and 27 to bar 16 and extends thence inwardly and rearwardly and is provided at its rearmost extremity with a sheath adapted to cover the point of the outside guard 12. In addition to strengthening the divider the member 26 has the further function of preventing the entering and lodgment of any grain between the divider bar and the outside guard at a point where the cutting mechanism would be inoperative to remove such accumulations. The divider supporting bracket 13 preferably extends outwardly some distance beyond the outer extremity of the cutter bar 10, as shown in Figs. 2 and 4, and the outer extremity of the same is slotted in such a manner as to receive one end of the brace bar 28, the forward extremity of which is bolted to the divider bar near the point as indicated at 29 and the rearward extremity of which is perforated and adapted to take one end of the locking pin 30 which is mounted to have vertical movement under the control of spring 31 interposed between a collar 32 secured to the pin and bearing at its other extremity against the housing support on the bracket 13. The bracket 13 is preferably of the form shown in detail in Figs. 4 and 6, and having at its inner side a vertical post provided with a rib 13$^b$ on the grainward side of the divider. This construction of the bracket 13 and the construction of the features already described of the removable divider enable the same to be placed in position with the rearmost extremity of the bar 16 within the slotted member or keeper 25, the sheath on the extremity of the bracket 26 over the point of guard 12, the perforated rear extremity of brace bar 28 within the slotted outer extremity of bracket 13 where it may be secured by a spring controlled locking pin 30 and at the same time the rearward extension 24 on brace bar 21 will be passed beyond the stubbleward side of the standard on bracket 13. With the spring controlled locking pin 30 in engagement with bar 28 of the divider, the divider will be secured against removal, but in order to make the attachment of the divider to the platform more secure, it is preferred that a further securing device in the form of a removable clamp be employed. Such clamp is shown and designated by the reference character 33 and consists of a metallic member perforated at one end and bolted by bolt 34 to upright bar 18 of the divider. The removable clamp 33 is provided with a hook portion as indicated at 35 adapted to engage over and around the rear edge of flange 13$^b$ on the upright portion of bracket 13. When, therefore, the hook clamp 35 is placed in the described position and its securing bolt and nut 34 are operated to bind the parts together, the upright support 18 of the divider will be seen to be locked securely to the bracket 13 which is rigidly secured to the cutter bar and the harvester platform.

The above construction, it will be seen, will enable the upright support and each member of the removable divider to be in secure engagement with the harvester platform and the divider when so secured will be so thoroughly braced that its displacement during the operation of the machine will be very unlikely to occur, the construction being practically as rigid and secure as in dividers of the non-revoluble type.

When it is desired to remove the divider for the purposes of transporting or storing the machine, the removable clamp 33 should be removed or loosened to allow the hooked portion thereof to be detached from the flange 13$^b$ on the upright bracket. The spring controlled locking pin 30 should then be lifted to release the end of brace bar 28 which may be slightly rotated on its forward pivotal connection to enable it to be disengaged from the slotted portion of bracket 13 after which the removable divider will be free to be slipped in the forward direction from the cutter bar and removed from the machine to be laid upon the platform for transportation or disposed of in any desired manner.

In the foregoing embodiment of the invention, the details of the preferred form have been described but to these it is not desired to be limited, as it will be apparent that various details may be modified without departing from the purpose and scope of the invention.

I claim—

1. The combination with a harvester grain receiving platform, of a divider bracket secured thereto, said bracket comprising branches one of which extends vertically from the grainward extremity of the platform and another of which extends longitudinally of the platform and beyond the grainward extremity thereof, a removable grain divider comprising a bar having a divider point and a divider board secured to the forward extremity of the bar, said divider board extending rearwardly and upwardly over the grainward end of the platform, an upright brace secured at its lower extremity to the bar and supporting the divider board at its upper extremity, a slotted seat on the platform adapted to receive the rearward end of the bar, a removable clamp secured to the upright brace and being adapted to engage the vertically extending branch of the divider bracket, and means for removably securing the divider near its forward extremity to the longitudinally extending branch of the divider bracket.

2. In combination with a harvester grain receiving platform, of a divider bracket secured thereto, said bracket comprising branches one of which extends vertically from the grainward extremity of the platform and another of which extends longitudinally of the platform and beyond the grainward extremity thereof, a removable grain divider comprising a bar having a divider point and a divider board secured to the forward extremity of the bar, said divider board extending rearwardly and upwardly over the grainward end of the platform, an upright brace secured at its lower extremity to the bar and supporting the divider board at its upper extremity, means on the platform for receiving and securing the rearward end of the bar, a flange on the upright branch of the bracket, and a removable hooked clamp secured to the upright brace and being adapted to engage the said flange on the vertically extending branch of the divider bracket, and a brace secured to the divider bar near the point thereof and being removably secured to the grainward extremity of the said longitudinally extending branch of the divider bracket.

3. The combination with a harvester grain receiving platform, of a divider bracket secured thereto, said bracket comprising a branch extending vertically from the grainward extremity of the platform, a removable grain divider comprising a bar having a divider point and a divider board secured to the forward extremity of the bar, said divider board extending rearwardly and upwardly over the grainward end of the platform, an upright brace secured at its lower extremity to the bar and supporting the divider board at its upper extremity, a brace fixed at its forward extremity to the divider bar and having a rearward extension beyond the said upright brace adapted to engage the vertical branch of the divider bracket on one side thereof, and a removable clamp secured to the upright brace and adapted to engage the said vertical branch of the divider bracket on the opposite side thereof.

In testimony whereof I have signed my name to this specification, in the presence of two subscribing witnesses, on this 3rd day of May A. D. 1911.

JOHN H. DOWNING.

Witnesses:
H. W. DAVIS,
S. D. PORTER.

---

Copies of this patent may be obtained for five cents each, by addressing the "Commissioner of Patents, Washington, D. C."